Figure 1:
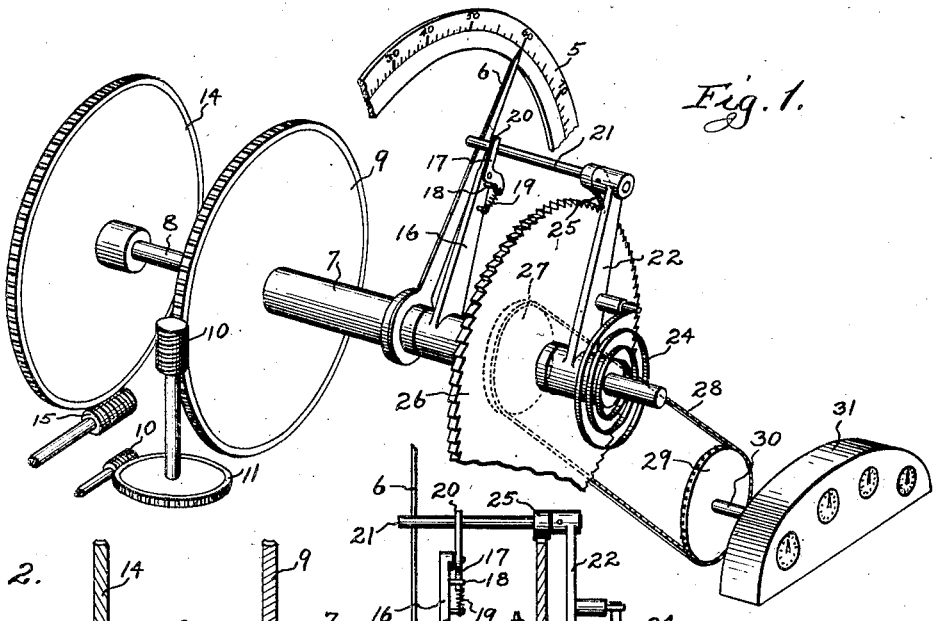

Aug. 4, 1925.

J. A. OBERMAIER 1,548,480

MECHANICAL INTEGRATOR

Filed Sept. 30, 1922        2 Sheets-Sheet 1

Witness:
Richard J. Jacker

Inventor:
John A. Obermaier

Aug. 4, 1925.  1,548,480
J. A. OBERMAIER
MECHANICAL INTEGRATOR
Filed Sept. 30, 1922  2 Sheets-Sheet 2

Witness:
Richard J. Jacker

Inventor:
John A. Obermaier

Patented Aug. 4, 1925.

1,548,480

UNITED STATES PATENT OFFICE.

JOHN A. OBERMAIER, OF CHICAGO, ILLINOIS, ASSIGNOR TO J. W. DANA, OF KANSAS CITY, MISSOURI.

MECHANICAL INTEGRATOR.

Application filed September 30, 1922. Serial No. 591,657.

*To all whom it may concern:*

Be it known that I, JOHN A. OBERMAIER, a citizen of the United States, and a resident of Chicago, in the county of Cook and State of Illinois, have invented a new and useful Improvement in Mechanical Integrators, of which the following is a specification.

My invention relates to an integrator in which a constantly moving part co-operating with a moved part, works in conjunction with the indicator hand or pointer, and the objects of my improvements are, first, to integrate or average the measurement of changes in any phenomena; second, to automatically operate a set of integrating dials; third, to make a device which is accurate in operation and simple in construction, and other features to become apparent from the description to follow.

In many measuring devices, in addition to indicating and graphic recording, it is desirable to integrate or totalize the variable phenomenon for the total time of its operation; e. g., in flow metering, it is often desirable to known the total flow for any period of time in addition to knowing the rate of flow at any instant. Similarly, in other cases it is desirable to find the average rate at which a given phenomenon happens; e. g., in measuring efficiency, it may be desirable to know the average efficiency for a given period of time in addition to knowing the efficiency at any instant. For both purposes an integrating or totalizing device is necessary. In the first case, the change of the integrator dial readings between any two periods will give the total flow for the time elapsed, while in the second case, the integrator dial change divided by the time elapsed will be proportional to the average efficiency for the period involved.

These desirable features are all obtained by the use of my invention, which comprises a pointer or indicator hand which is moved by the changing phenomenon co-operating with a graduated dial, be that phenomenon pressure, speed, flow, efficiency, etc., an integrating arm pivoted in alignment with said pointer, and mechanism which automatically moves said integrating arm from the zero position to the variable positions of the indicator hand at definite short intervals of time through the whole working time.

Figure 2:
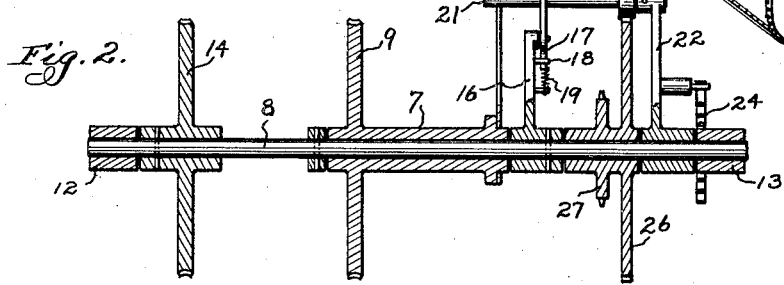
Figure 3:
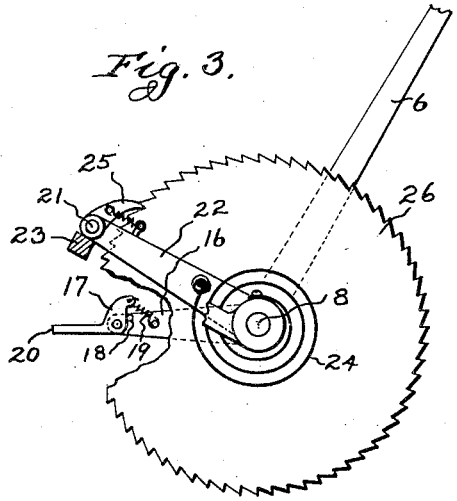
Figure 4:
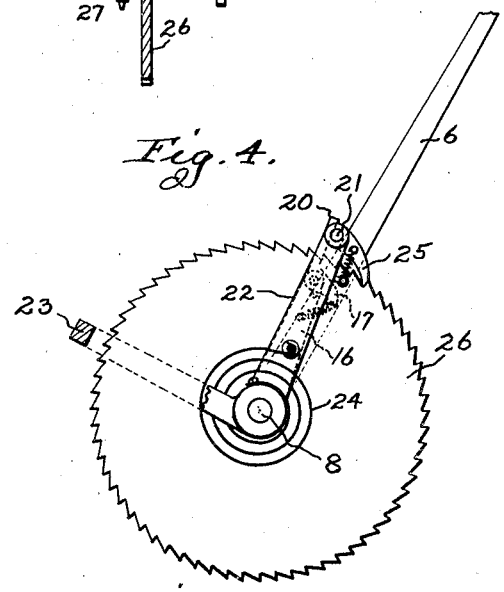
Figure 5:
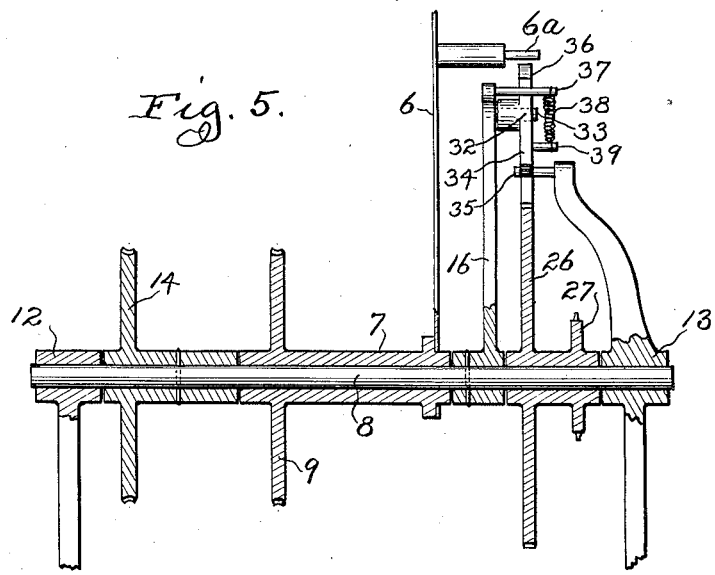
Figure 6:
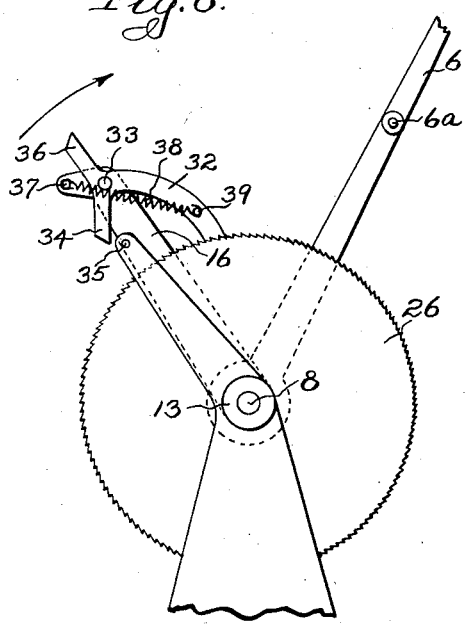
Figure 7:
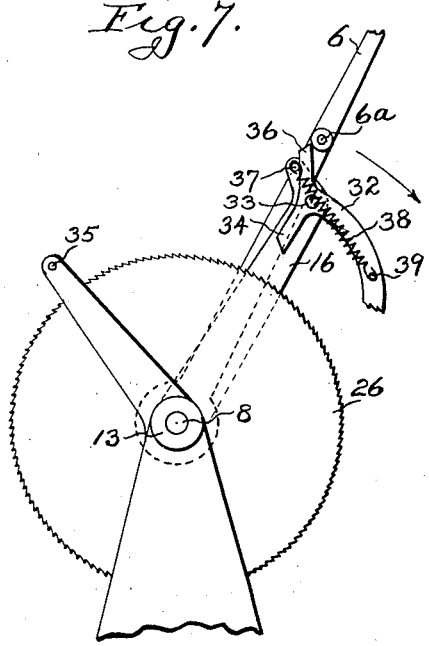

To describe my invention so that others versed in the art to which it pertains can make and use the same, I have illustrated it on the accompanying two sheets of drawings forming a part of this specification and in which:

Figure 1, is a fragmentary perspective view of an integrator embodying my invention; Fig. 2, is a longitudinal sectional view through the main shaft partly in elevation; Fig. 3 is a right-hand end view partly in section of the device shown in Figs. 1 and 2, showing the pawl arm in its zero position; Fig. 4, is a similar view showing the parts in a different position; Figs. 5, 6 and 7 are a longitudinal sectional view, a right hand end view in one position and a right hand end view in another position, respectively, of a modified form of my invention.

Similar reference characters refer to similar parts throughout the several views.

Co-operating with the graduated dial 5 is the indicator hand 6, rigidly mounted on the sleeve 7, mounted loosely on the shaft 8 and having rigidly mounted thereon the worm gear 9. The worm gear 9 is moved about its pivot under the control of the changing phenomenon, be that pressure, speed, flow, efficiency, etc., by means of any of the usual connections as the worms 10 and gear 11. The worm wheel 9 is employed to practically lock the indicator hand 6, in its every position, so that if pressure is applied on said hand 6 it will not be moved.

The shaft 8, is mounted in suitable bearings 12 and 13 and has rigidly mounted thereon adjacent the bearing 12 the worm wheel 14, meshing with the worm 15, which is constantly rotated by a motor not shown so that the shaft 8 and the arm 16, rigidly mounted thereon adjacent the indicator hand 6, are constantly rotated. At its free end the arm 16, is provided with a pivoted pawl 17, which is yieldingly held in its normal position against the stop 18, by a spring 19. When the pawl 17 is in its normal position its extension 20, lies in the path of the rod 21, rigidly mounted on the free end of the arm 22, which is loosely mounted to swing about shaft 8 as a pivot adjacent the bearing 13. The arm 22 is normally yieldingly held at its zero position against the stop 23 by the spring 24. The free end of the arm 22, also has the spring pressed pawl 25 mounted thereon which is arranged to engage the teeth of the ratchet wheel 26, loosely mounted on shaft 8 between the arms 16 and 22. Integral with or rigidly connected to the ratchet wheel 26 is a small sprocket wheel 27, connected by an endless chain 28 to a similar sprocket wheel 29 mounted on the driving shaft 30, of a set of integrating dials 31.

The rod 21 is of such length that its free end remote from arm 22, lies in the path of the indicator hand 6, and the spring 19 is sufficiently strong to overcome the pressure exerted by the spring 24. The parts are so arranged that during each revolution of shaft 8, the extension 20, of pawl 17 will engage and move the rod 21, from its zero position, clockwise as viewed in Fig. 3, until said rod 21 engages the indicator hand 6, as viewed in Fig. 4, when the pawl 17, will swing about its pivot against the tension of spring 19 and snap past the rod 21, whereupon the rod 21 and arm 22 will be returned to their zero position by spring 24, as viewed in Fig. 3. The same cycle of movements will be repeated during each revolution of shaft 8, which for convenience is preferably made once every five seconds. Obviously, each time the rod 21 is moved clockwise about shaft 8, as above described, the ratchet wheel 26, by means of the pawl 25, will be rotated through the same degree angle as the swing of the indicator pointer or hand 6. However, when the rod 21 and arm 22 are returned counter-clockwise by the spring 24, the ratchet wheel 26 is not returned and each successive movement of the rod 21 is added to all the previous movements of the ratchet wheel 26 and therefore also added to that numerical quantity which is registered by the set of integrating dials 31, by means of the connecting sprocket wheels 27 and 29 and chain 28. Thus the integrating dials 31, at all times register the total sum of the various positions of the indicator hand 6, taken every five seconds, and giving the total of any given phenomenon affecting the indicator. If the average during any particular time, e. g., an hour, is desired, the sum total indicated by the dials 31, during that hour need only to be divided by a definite constant, which in this case is 12, since there are twelve five second periods in one hour.

In Figs. 5, 6 and 7, I have illustrated a modified and simpler construction of my invention, in which a pawl 32 is mounted on the pivot 33 secured to the free end of the arm 16 and the said pawl 32 is provided with a tripping projection 34 to engage the stop 35 rigidly secured to the bearing 13, and another tripping projection 36 to engage the stop 6ª mounted on the indicator hand 6. By means of the tripping projections 34 and 36, the pawl 32 is moved from one of its two positions to the other and vice versa. One position of the pawl 32 is in engagement with the ratchet wheel 26 as seen in Fig. 6, and the other position is out of engagement with ratchet wheel 26 as seen in Fig. 7. A spring 38 is interposed between the pin 37, which serves to stop the movement of the pawl 32 in one direction, and the pin 39 secured to the pawl. Said spring 38 serves to yieldingly hold the pawl 32 in whatever position it is moved to, i. e., engaging the ratchet wheel 26 or not engaging the ratchet wheel 26.

In operation the arm 16 is constantly rotated clockwise as indicated by arrows in Figs. 6 and 7, carrying the pawl 32 in a circular path about the periphery of ratchet wheel 26. When the arm 16 reaches the position shown in Fig. 6, the projection 34 will engage the stop 35 and move the pawl into engagement with the ratchet wheel 26 causing the same to be carried around with the arm 16 until the position shown in Fig. 7 is reached, when the projection 33 will engage the stop 6ª and move the pawl out of engagement with the ratchet wheel 26. Thus it is clear that the position of the indicator hand 6 determines the distance that the ratchet wheel 26 is carried around, similarly to the result produced by the mechanism illustrated in Figs. 1 to 4 inclusive, and described above.

Thus it is clear that by the use of my invention, the total as well as the average of any phenomena can be ascertained automatically, and the device is simple in construction and accurate in operation.

Having thus fully described my invention, what I claim as new and desire to secure by Letters Patent of the United States is:—

1. In a device of the class described, in combination with an indicator arm, means for successively adding the amount indicated by the arm at certain predetermined intervals comprising an element yieldingly held in its zero position and a constantly rotating element to engage and move said first named element to stop against the indicator arm.

2. In a device of the class described, in combination with an indicator arm, means for adding the amount indicated by the arm at predetermined intervals of time, comprising a constantly rotating element having its axis of rotation in alignment with the axis of rotation of the indicator hand.

3. In a device of the class described, in combination with an indicator arm, means for adding the amount indicated by the arm at certain predetermined intervals comprising an element which is moved until stopped by the arm and means for moving said element.

4. In a device of the class described, in combination with an indicator arm, means for adding the amount indicated by the arm at certain predetermined intervals comprising mechanism embodying a spring pressed pawl and a wheel engaged by the pawl, said wheel being moved until stopped by the arm and means for moving said mechanism.

5. In a device of the class described, in combination with an indicator arm, means for adding the amount indicated by the arm at certain predetermined intervals comprising constantly moving mechanism embodying a spring pressed pawl and a wheel with which the pawl co-operates, said wheel being moved until stopped by the indicator arm.

6. In a device of the class described, in combination with an indicator arm, means for adding the amount indicated by the arm at certain predetermined intervals comprising a ratchet wheel yieldingly held in its moved position, said ratchet wheel being moved until stopped by the indicator arm and means for moving said mechanism.

7. In a device of the class described, in combination with an indicator arm, means for adding the amounts indicated by the arm at predetermined intervals of time, comprising mechanism embodying a spring pressed pawl to co-operate with a ratchet wheel which is yieldingly held in its moved position and is moved intermittently from such position until stopped by the arm and means for moving said mechanism.

8. In a device of the class described, in combination with an indicator arm, means for adding the indicated amount of the arm at predetermined intervals of time, comprising mechanism embodying a spring pressed pawl and a ratchet wheel with which it co-operates, said wheel being yieldingly held in its moved position and intermittently moved from such position until stopped by the arm and constantly moving means for moving said mechanism.

9. In a device of the class described, in combination with an indicator arm, means for adding the indicated amounts of the arm at predetermined intervals of time, comprising mechanism embodying a spring pressed pawl and a ratchet wheel with which the pawl co-operates, said ratchet wheel being yieldingly held in its moved position and intermittently moved from said position until stopped by the arm, said ratchet wheel arranged to operate a set of integrating dials and means for moving said mechanism.

10. In a device of the class described, in combination with an indicator arm, means for adding the indicated amount of the arm at predetermined intervals of time, comprising rotating mechanism pivoted about an axis in alignment with the axis of rotation of the indicator arm and arranged to be moved about its pivot until stopped by the indicator hand and a constantly rotating element having its axis of rotation in alignment with the axis of rotation of the indicator arm for moving said first named mechanism.

11. In combination, a first element responsive to a controlling variable, a driving element, a driven element, means for connecting the driving element to the driven element at a predetermined point and for disconnecting it therefrom at a variable point controlled by the said first element, and means for returning the said driven element to the said predetermined point.

12. In combination, a first element responsive to a controlling variable, a driving element, a driven element, means for connecting the driving element to the driven element at a predetermined point and for disconnecting it therefrom at a variable point controlled by the said first element, means for returning the said driven element to the said predetermined point, and integrating means actuated by the said driven element.

13. In combination, a first movable element responsive to a controlling variable, said element being movable in a fixed path a variable distance from a zero position in accordance with the corresponding value of the controlling variable, a second movable element periodically traversing a path adjacent the path of the first element, a third movable element adapted to be moved periodically by the second element, integrating means actuated by said third movable element, and clutch means between the second element and the third element controlled by the position of the first element.

14. In combination, a first movable element responsive in position to a controlling variable, a uniformly moving driving element, a variably movable driven element and clutch means between the driving and driven element thrown into action at a fixed point and thrown out of action at a variable point corresponding to the position of the first movable element.

15. In combination, a pointer having a zero position and being movable in a fixed plane to a variable distance from zero position in accordance with the value of a controlling variable, a driven element having integrating means, a driving element between the pointer and the driven element, and clutch means therefor thrown into action at a point corresponding to the zero position of the pointer and thrown out of action at a point corresponding to the indicating position of the pointer.

16. In combination, a pointer varied in position to correspond to the value of a controlling variable, a locking worm gear for driving said pointer, integrating mechanism for periodically engaging said pointer, and continuously rotating means for bringing the integrating means into engagement with the said pointer.

17. In combination, a pivoted element responsive in angular position to a controlling variable, a co-axial rotary driving element having a regular periodic motion, a co-axial variably movable rotary driven element and clutch means between the driving and driven elements thrown into action at a fixed point and thrown out of action at a variable point corresponding to the angular position of the first element.

18. In combination, a pointer having a zero position, said pointer being movable on one side of said zero position to indicate the value of a variable, an integrating element adapted to move in the direction of increasing values of said pointer for increased registration, a driving element movable in the same direction as the integrating element, and clutch means for clutching the integrating element to the driving element.

19. The combination with a first element of means for causing a relative movement between the said element and a variable, means associated with the first element for indicating the said relative movement, a driving element, a driven element, and means for connecting the driving element to the driven element at a predetermined point and for disconnecting it therefrom at a variable point controlled by the indicating means.

20. The combination with a first element of means for causing a relative movement between the said element and a variable, means associated with the first element for indicating the said relative movement, a driving element, a driven element, means for connecting the driving element to the driven element at a predetermined point and for disconnecting it therefrom at a variable point controlled by the indicating means, a counter, and means associated with and controlled by the said driven element for causing the indicated relative movement to be integrated in the counter.

21. The combination with a first element of means for causing a relative movement between the said element and a variable, means associated with the first element for indicating the said relative movement, a driving element, a driven element, means for connecting the driving element to the driven element at a predetermined point and for disconnecting it therefrom at a variable point controlled by the indicating means, a counter, means associated with and controlled by the said driven element for causing the indicated relative movement to be integrated in the counter, and means for returning the last mentioned means to the said predetermined point.

22. The combination with a first element of means for causing a relative movement between the said element and a variable, means for indicating the said relative movement, a driving element, an arm integral with the said driving element, a driven element, and means associated with the said arm for engaging the driven element at a predetermined point and for disconnecting it therefrom at a variable point controlled by the indicating means.

23. The combination with a first element of means for causing a relative movement between the said element and a variable, means for indicating the said relative movement, a driving element, an arm integral with the said driving element, a driven element including a ratchet and pawl arrangement, and means associated with the said arm for causing the said pawl to operatively engage the ratchet at a predetermined point and to ride idly thereon at a variable point controlled by the indicating means.

24. The combination with a first element of means for causing a relative movement between the said element and a variable, means for indicating the said relative movement, a driving element, an arm integral with the said driving element, a driven element including a ratchet and pawl arrangement, means associated with the said arm for causing the said pawl to operatively engage the ratchet at a predetermined point and to ride idly thereon at a variable point controlled by the indicating means, a counter, and means associated with and controlled by the pawl and ratchet arrangement for causing the indicated relative movement to be integrated in the counter.

In testimony whereof I have signed my name to this specification in presence of a subscribing witness, this 20th day of September, 1922, at Chicago, Illinois.

JOHN A. OBERMAIER.

Witness:
RICHARD J. JACKER.